Figure 1:
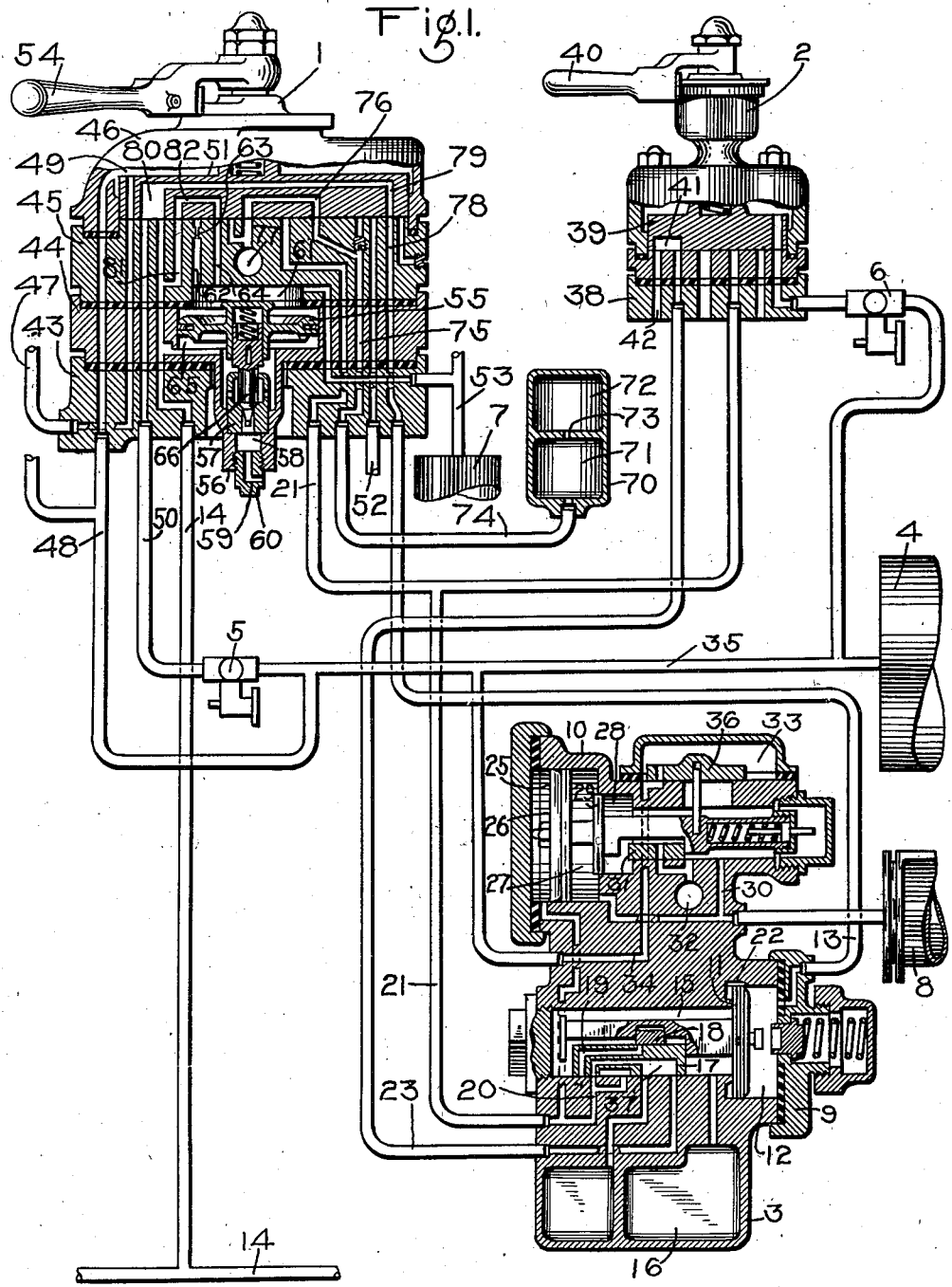

April 14, 1942.  G. T. McCLURE  2,279,393
LOCOMOTIVE BRAKE EQUIPMENT
Filed Nov. 28, 1940   4 Sheets-Sheet 1

INVENTOR
GLENN T. McCLURE
BY *A. M. Higgins*
ATTORNEY

April 14, 1942.    G. T. McCLURE    2,279,393
LOCOMOTIVE BRAKE EQUIPMENT
Filed Nov. 28, 1940    4 Sheets-Sheet 2

INVENTOR
GLENN T. McCLURE
BY A. M. Wiggins
ATTORNEY

April 14, 1942. G. T. McCLURE 2,279,393
LOCOMOTIVE BRAKE EQUIPMENT
Filed Nov. 28, 1940 4 Sheets-Sheet 3

INVENTOR
GLENN T. McCLURE
BY A. M. Higgins
ATTORNEY

April 14, 1942.  G. T. McCLURE  2,279,393

LOCOMOTIVE BRAKE EQUIPMENT

Filed Nov. 28, 1940  4 Sheets-Sheet 4

INVENTOR
GLENN T. McCLURE
BY *A. M. Higgins*
ATTORNEY

Patented Apr. 14, 1942

2,279,393

UNITED STATES PATENT OFFICE 2,279,393

LOCOMOTIVE BRAKE EQUIPMENT

Glenn T. McClure, Wilmerding, Pa., assignor to The Westinghouse Air Brake Company, Wilmerding, Pa., a corporation of Pennsylvania Application November 28, 1940, Serial No. 367,502

40 Claims. (Cl. 303—40)

This invention relates to fluid pressure brake equipment and more particularly to the type used on locomotives for controlling the brakes on the locomotive and cars of a train.

In an automatic fluid pressure brake system the brakes on a train are applied by operating the engineer's automatic brake valve device on the locomotive to effect a reduction in brake pipe pressure. Since the brake pipe reduction is effected initially at the head of the train, the brakes on the train apply serially from the locomotive toward the rear end of the train. As a result of this serial brake action, the front end of the train tends to decelerate ahead of the rear end and causes a gathering or running in of the slack in the train toward the front end. Under certain operating conditions, and particularly on long trains, this running in of the slack may cause excessive shocks and possible damage to parts of the train.

One object of the present invention is therefore the provision of improved means which is operative in effecting an application of the brakes on a train to delay the application of the brakes on the locomotive so that the inertia of the locomotive will act to retard the running in of slack toward the head end of the train sufficiently to prevent the development of such shocks.

Another object of the invention is to provide improved means which is operative in effecting an application of brakes on a train to delay the application of brakes on the locomotive, and at the same time to limit the degree of brake application on the cars so that the inertia of the locomotive may be effective to retard the gathering of the slack in the train by the relatively light or limited application of brakes on the cars of the train.

Still another object of the invention is the provision of improved means for causing a gentle gathering of the slack in the train when an application of the brakes is effected, which means is adapted to be embodied in the well known No. 6–ET locomotive brake equipment by relatively simple modifications thereof and/or by the addition to said equipment of suitable, relatively simple and inexpensive devices.

In accordance with these objects an engineer's automatic brake valve device is provided with what is termed a first service position which is adapted to be used for initiating an application of brakes on a train and for automatically limiting the application to a degree which will cause a gentle running in of the train slack. The brake valve device is also adapted to control a communication in which a variation in pressure will effect an application of the locomotive brakes, this control being so arranged that in the first service position of the brake valve device the application of brakes on the locomotive will be delayed. By the use of this first service position the inertia of the locomotive of a train is thus adapted to be maintained effective to act in conjunction with the limited degree of brake application on the cars of the train to insure a gentle gathering of the slack in the train.

The brake valve device also has the well known service position which is adapted to be used after the lapse of a sufficient period of time for the slack in the train to gather for causing an application of brakes on both the locomotive and cars of the train to a degree required to decelerate or bring the train to a stop, as desired.

Of importance is the fact that the benefits of the invention may be obtained from the well known No. 6–ET locomotive brake equipment, which has been standard on American railroads for years, without changing any of the valve devices of said equipment except the engineer's No. 6 brake valve device, and even such changes as are required in said brake valve device are of minor character.

To obtain the benefits of the invention in the No. 6–ET locomotive brake equipment, the holding position of the No. 6 automatic brake valve device is converted into a first service position which is adapted to be used for effecting a limited application of brakes on the cars of the train and for at the same time delaying the application of locomotive brakes in order to provide for the gentle gathering of slack in a train, as hereinbefore described. No other position of the No. 6 brake valve device is changed.

The passage in the No. 6 brake valve device heretofore employed for releasing the locomotive brakes in running position by way of the well known distributing valve release pipe is in accordance with the present invention connected to a reduction limiting reservoir. The rotary valve in the brake valve device is preferably modified, although a new rotary valve may be substituted if desired, by the closing of cavities or ports pertinent to the old holding position, and by the provision of new cavities or ports so arranged that the passage connected to the reduction limiting reservoir will be vented in the release and running positions of the brake valve device and connected in the first service position to the passage leading to the top of the usual equalizing discharge valve piston, which is in constant communication with the equalizing reservoir. The reduction limiting reservoir is of such volume with respect to that of the equalizing reservoir that, when connected to the equalizing reservoir in the first service position of the brake valve device, only a relatively small degree of reduction in pressure in the equalizing reservoir will occur for causing a correspondingly small and limited application of brakes on the cars of the train to cause a gentle running in of the train slack.

The brake valve device is also arranged to control a communication in which a variation in pressure is necessary to apply the locomotive brakes. In the first service position the brake valve device is adapted to prevent or delay such variation in fluid pressure so as to delay the application of locomotive brakes but in the usual service position is adapted to provide for such variation so as to thereby cause the application of locomotive brakes.

The communication just described may be controlled directly through the No. 6 automatic brake valve device by the provision of a new passage in the brake valve body and suitable cavities and ports in the rotary valve, or may be controlled indirectly through the medium of a relatively simple valve device added to the equipment and which is operative in accordance with the operation of the brake valve device, but the use of which does not require any modification of the brake valve device. Either arrangement will produce substantially the same desired results.

Other objects and advantages will be apparent from the following more detailed description of the invention.

Figure 2:
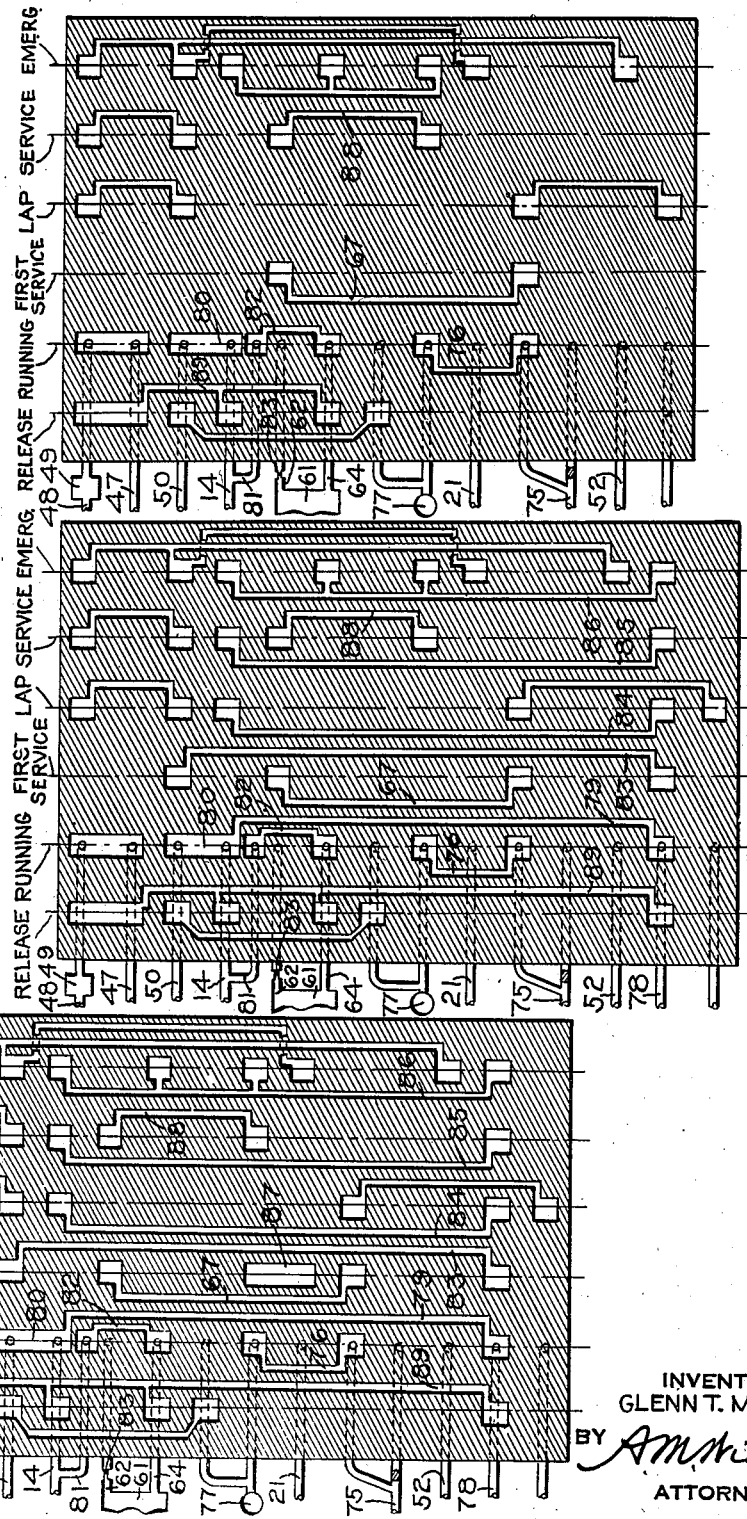
Figure 3:
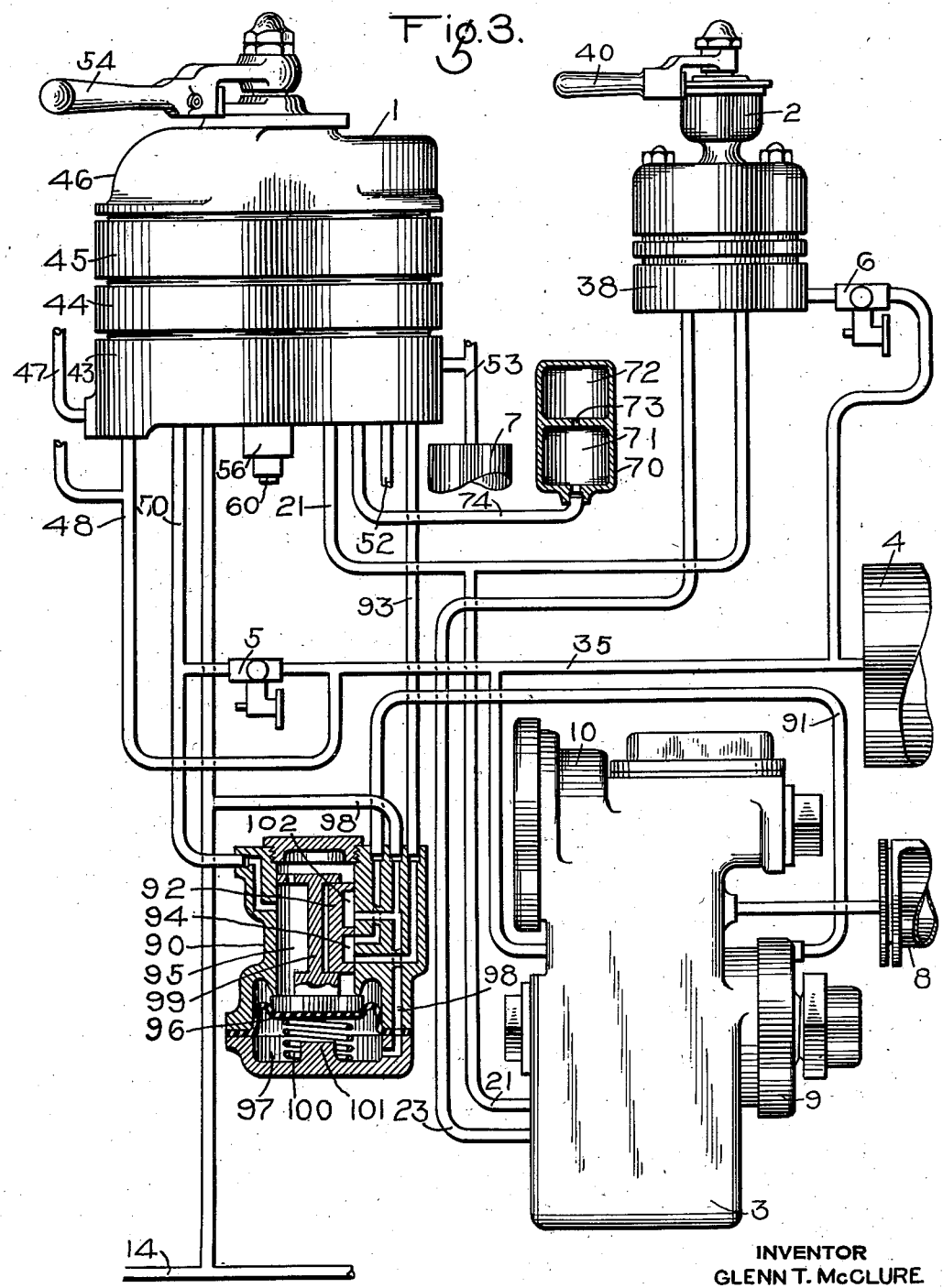
Figure 5:
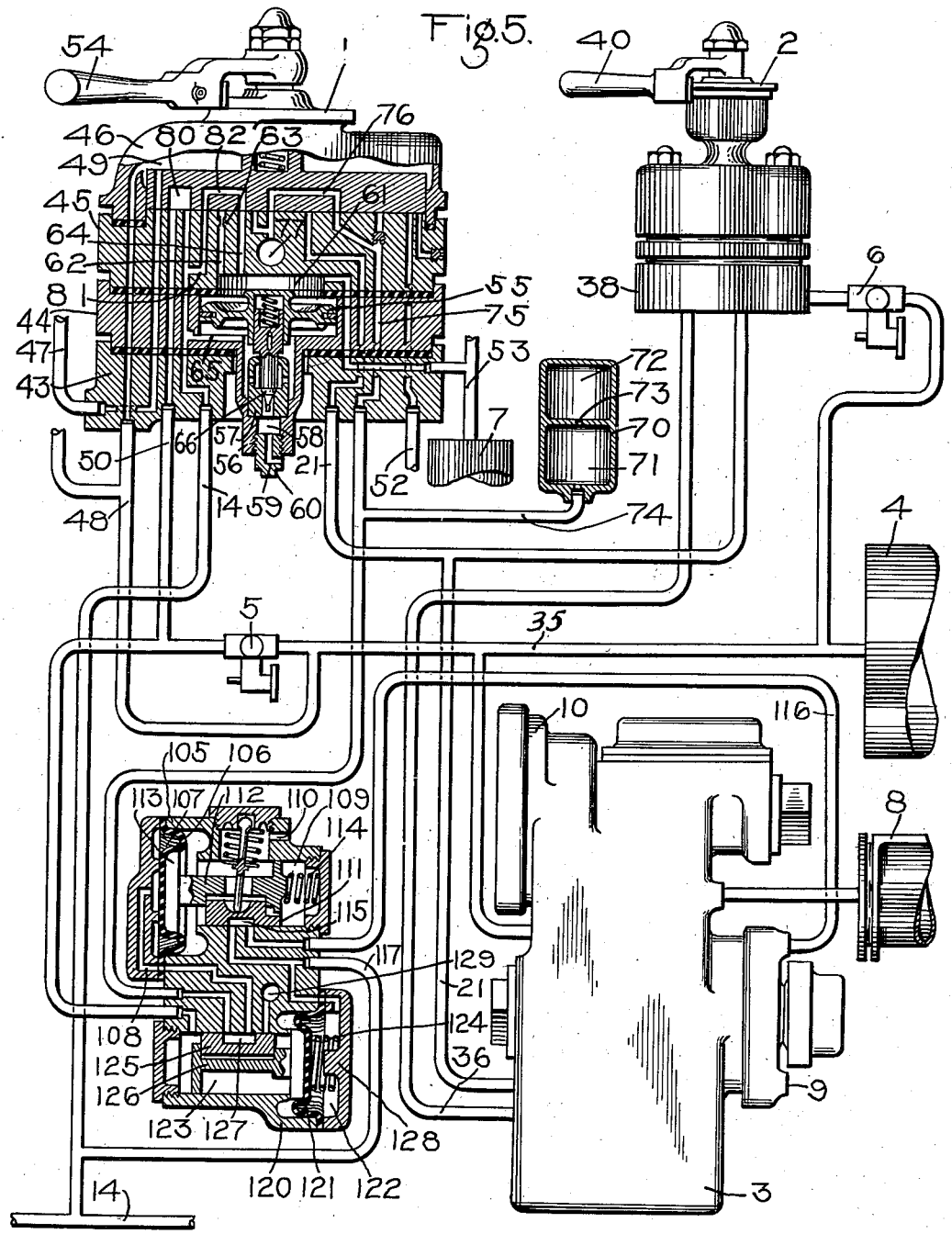

In the accompanying drawings; Fig. 1 is a diagrammatic view, mainly in section, of a modified No. 6–ET locomotive brake equipment embodying one form of the invention; Fig. 2 is a diagrammatic, development view of the rotary valve and rotary valve seat of the engineer's automatic brake valve device shown in Fig. 1; Fig. 3 is a diagrammatic view similar to Fig. 1 illustrating another embodiment of the invention; Fig. 4 is a diagrammatic, development view of the rotary valve and seat of the automatic brake valve device shown in Fig. 3; Fig. 5 is a diagrammatic view, partly in section and partly in outline, of a modified No. 6–ET locomotive brake equipment embodying still another form of the invention; and Fig. 6 is a diagrammatic development view of the rotary valve and seat of the automatic brake valve device shown in Fig. 5.

*Description—Fig. 1*

The locomotive brake equipment shown in Fig. 1 comprises an engineer's automatic brake valve device 1, an independent brake valve device 2, a distributing valve device 3 and the usual main reservoir 4, feed valve device 5, reducing valve device 6, equalizing reservoir 7, and brake cylinder device 8. All of these parts are identical to corresponding parts in the No. 6–ET locomotive brake equipment except the automatic brake valve device 1 which is provided with certain slight modifications to be hereinafter brought out, whereby the benefits of the present invention are obtained.

The distributing valve device 3 comprises an equalizing portion 9 and an application portion 10. The equalizing portion 9 comprises a piston 11 having at one side a brake pipe chamber 12 adapted to be connected through a pipe 13 with the usual brake pipe 14 and having at the opposite side an equalizing valve chamber 15 which is open to a pressure chamber 16, the chambers 15 and 16 being normally charged with fluid under pressure from the brake pipe by way of the piston chamber 12 and through a feed groove 22. In the valve chamber 15 is a main slide valve 17 and an auxiliary slide valve 18. These slide valves and the piston 11 are shown in their brake release position. The piston 11 is adapted to respond to a reduction in brake pipe pressure in chamber 12 to move the slide valves 17 and 18 to their usual service position in which a service port 19 in the main slide valve 17 is adapted to be opened to the valve chamber 15 and connected to a passage 20 for supplying fluid under pressure from the pressure chamber 16 to the application portion 10 of the distributing valve device to effect an application of locomotive brakes. The passage 20 is also connected with the usual application cylinder pipe 21 leading to the brake valve devices 1 and 2.

The application portion 10 of the distributing valve device comprises an application piston 25 having at one side a chamber 26 commonly known as the application cylinder, and which is open to and adapted to receive fluid under pressure from the passage 20. At the opposite side of piston 26 is a chamber 27 open to the brake cylinder device 8 and separated from a valve chamber 28 by a baffle piston 29, the brake cylinder device being connected to said valve chamber through a passage 30. In valve chamber 28 is a slide valve 31 which is connected for operation by the piston 25 to control communication between said chamber and a brake cylinder exhaust port 32. In the position of piston 25 and slide valve 31 shown the brake cylinder device 8 is open to the exhaust port 32 to provide for the release of locomotive brakes. Upon the supply of fluid under pressure to the application piston chamber 26 the piston 25 is adapted to move and shift the slide valve 31 to a position for closing communication between the valve chamber 28 and the exhaust port 32.

The application portion of the distributing valve device further has a chamber 33 in constant communication with the main reservoir 4 through a passage 34 and a main reservoir pipe 35. A slide valve 36 in the chamber 33 is connected for movement with the application piston 25 and is arranged to control communication between the chamber 33 and valve chamber 28. This communication is adapted to be closed by the slide valve 36 when the application piston occupies its normal release position shown, and is adapted to be opened by said slide valve upon movement of piston 25 by fluid under pressure supplied to the chamber 26 to thereby supply fluid under pressure to the valve chamber 28 and thence to the brake cylinder device 8 for applying the brakes on the locomotive.

With the parts of the equalizing portion 9 of the distributing valve device in their release positions shown, the application piston chamber 26 is connected to the usual distributing valve release pipe 23 through passage 20 and a cavity 37 in the slide valve 17.

The independent brake valve device 2 is of conventional structure comprising a casing 38 which contains a rotary valve 39. A handle 40 is provided for turning the rotary valve from the normal position shown to the various other well known locomotive brake controlling positions.

With the rotary valve 39 in the position shown the distributing valve release pipe 23 is connected through a cavity 41 in said valve to a passage 42 which is open to the atmosphere so as to thereby provide for release of fluid under pressure from the application piston chamber 26 in the distributing valve device when the equalizing portion 9 is in its release position shown.

The independent brake valve device 2 is identical in construction and function to the well known corresponding device in the No. 6-ET locomotive brake equipment, and since the novel functions of the invention are obtained without movement of the rotary valve 39 from its normal position shown a further description of the brake valve device is not deemed essential.

The automatic brake valve device 1 comprises a casing which is built up of three sections 43, 44, and 45 mounted one on top of the other and a cover 46 is mounted on the top casing section 45, said sections and cover being rigidly clamped together in the usual manner.

The cover 46 has a chamber 49 containing a rotary valve 51 which is mounted on a seat provided on the adjacent end face of casing section 45. A handle 54 is connected to the rotary valve for turning it to its various well known brake controlling positions, viz.—release, running, lap, service, and emergency positions.

The casing section 43 constitutes a pipe bracket to which is connected the following pipes: pipe 47 for controlling the usual steam compressor governor (not shown), pipe 48 connected to the main reservoir pipe 35 and through which fluid at main reservoir pressure is adapted to be supplied to the rotary valve chamber 49, pipe 50 connected to the feed valve device 5, brake pipe 14, application cylinder pipe 21, sanding pipe 52, and pipe 53 connected to the equalizing reservoir 7. All pipes just enumerated except pipe 48 are connected to the seat of the rotary valve 51 for control thereby in the usual manner in the various positions of said valve.

The casing section 44 has a chamber containing an equalizing discharge valve piston 55, and depending from this section through a suitable central opening in the casing section 43 is a boss 56. This boss contains a bushing 57 the lower end of which is open to the atmosphere through a chamber 58 and a restricted port 59 in the usual brake pipe discharge fitting 60. At the upper face of equalizing piston 55 is a chamber 61 which is connected to the equalizing reservoir 7 through pipe 53. The chamber 61 is connected to the seat of the rotary valve 51 through the usual preliminary exhaust port 62 which contains a choke 63 for controlling the rate of a service reduction in pressure in the equalizing reservoir 7 in effecting a service application of brakes. The chamber 61 is also connected to the seat of the rotary valve by a passage 64 through which said chamber and the equalizing reservoir 7 are adapted to be charged with fluid under pressure.

At the opposite or lower side of the equalizing piston 55 is a chamber 65 which is open to the brake pipe 14. A brake pipe discharge valve 66 is slidably mounted in a suitable bore in the bushing 57 and is adapted to control communication between chamber 65 and the brake pipe vent port 59. The discharge valve 66 is connected for movement with the equalizing piston 55 which is adapted to operate upon a reduction in pressure in chamber 61 and thereby in the equalizing reservoir 7 to open said valve for venting fluid under pressure from the brake pipe 14 to effect a service application of the brakes. When the pressures in the equalizing reservoir 7 and in chamber 61 are substantially equalized with that in the brake pipe 14 acting in chamber 65 on the opposite side of piston 55, said piston is adapted to seat the brake pipe discharge valve 66.

The detailed structure and operation of the parts of the locomotive brake equipment so far described are identical to corresponding parts of the No. 6-ET locomotive brake equipment which for years has been standard on American railroads and is well known to those skilled in the art. Further, reference may be made to Instruction Pamphlet 5032 issued by the Westinghouse Air Brake Company, dated November 1932, and entitled "No. 6-ET locomotive brake equipment" for a full description of the structure and operation of these parts of the brake equipment. A further description of these parts is therefore not deemed essential in the present application and reference thereto in the description to follow will therefore only be made as required for a complete understanding of the invention.

According to the invention, the holding position of the H-6 automatic brake valve device of the No. 6-ET locomotive brake equipment is converted to a first service position, as indicated in Fig. 2, and by suitable modifications of the rotary valve 51 or by the substitution of a new rotary valve the functions of the old holding position are eliminated.

A reduction limiting reservoir 70 is added to the equipment. This reservoir has two reduction chambers 71 and 72 in constant communication with each other through a restricted port 73. The chamber 71 is connected by a pipe 74 to a passage 75 in the automatic brake valve device. This passage is the old distributing valve release pipe passage of the well known No. 6-ET equipment and formerly was connected by a U pipe to passage 42 in the independent brake valve device.

The rotary valve 51 is either a modified valve or a new valve having a cavity 76 for connecting the passage 75 to the usual exhaust port 77 in running position of the rotary valve as shown in Fig. 1. The passage 75 is adapted to be connected to the preliminary exhaust port 62 leading to the top of the equalizing piston 55 in the first service position of the brake valve device by way of a cavity in the rotary valve 51 indicated by reference numeral 67 in Fig. 2.

A new passage 78 is provided in the brake valve device and leads from the seat of the rotary valve 51 to pipe 13 communicating with the equalizing piston chamber 12 in the distributing valve device 3. The rotary valve 51 is modified or as above mentioned may be replaced by a new rotary valve if preferred to provide a port 79 which in the running position of the rotary valve will connect the passage 78 to the usual feed valve charging cavity 80 in the rotary valve. The cavity 80 is, as shown in Fig. 1, connected to the brake pipe 14 as well as to the feed valve pipe 50, so that at the same time that fluid under pressure is supplied from the feed valve device to the brake pipe for charging same, fluid at the same pressure will be supplied through the port 79, passage 78 and pipe 13 to the equalizing piston chamber 12 in the distributing valve device. The equalizing piston chamber 61 and equalizing reservoir 7 in the brake valve device 1 are adapted to be charged with fluid under pressure at the same time as the brake pipe is charged by way of the usual passage 81, cavity 82 in the rotary valve and passage 64.

In release position of the automatic brake valve device the new passage 78 is adapted to be connected to the rotary valve chamber 49 by a cavity indicated by the reference numberal 89 in Fig. 2. In the first service position of the brake valve device passage 78 is adapted to be connected to the feed valve pipe 50 through a cavity in the rotary valve indicated in Fig. 2 by reference numeral 83. In the usual lap, service, and emergency positions of the brake valve device passage 78 is adapted to be connected to the brake pipe 14 through the rotary valve by way of ports indicated in Fig. 2 by reference numerals 84, 85, and 86, respectively.

The rotary valve also has a new cavity 87 for connecting the application cylinder pipe 21 to the exhaust port 77 in the first service position of the brake valve device.

It is desired to point out that Fig. 2, like Figs. 4 and 6, are merely diagrammatic drawings employed for bringing out clearly and simply the connections established by the rotary valve 51 in the different positions thereof and are therefore not intended to show actual structure. Actual structure would necessitate several additional and very complicated views. This fact is mentioned because in practice the function of several cavities, such for instance as those indicated by reference numerals 84, 85, and 86 in the diagrammatic view in Fig. 2 might be performed by a single cavity. In other words, the difference between the old and new rotary valve would not be as great as might be construed from the diagrammatic views as will be readily understood by those skilled in the art. For the sake of simplicity and clarity views showing actual structure are therefore not deemed either necessary or desirable and have been omitted.

*Operation—Fig. 1*

When the automatic brake valve device is in its running position shown in Fig. 1, the brake pipe 14 and equalizing reservoir 7 are both adapted to be charged with fluid under pressure from the feed valve device 5 and the equalizing piston 55 will operate in the usual manner to hold the brake pipe discharge valve 66 seated. With the brake pipe 14 charged the brakes on the cars of a train coupled to the locomotive will be released.

At the same time as the brake pipe is charged with fluid under pressure from the feed valve device 5, pipe 13 is also charged from the same source through cavity 80 and port 79 in rotary valve 51, and the parts of the distributing valve device 3 will therefore assume their release positions shown for releasing the brakes on the locomotive and for charging the pressure chamber 16 with fluid under pressure.

With the brake valve device in running position the reduction limiting reservoir 70 is open to the atmosphere through pipe 74, passage 75, cavity 76 in rotary valve 51 and exhaust port 77.

The brake equipment is now in condition for controlling the brakes on a train, and let it be assumed that the locomotive is coupled to a train requiring special control of the application of brakes to prevent excessive and damaging slack action.

When it is desired to apply the brakes on the train the engineer first moves the automatic brake valve device 1 from the running position to the first service position in which communication between the feed valve device 5 and the brake pipe and equalizing reservoir 7 is closed, and said reservoir and the equalizing piston chamber 61 are placed in communication with the reduction limiting reservoir 70 through the usual preliminary exhaust port 62. The pressure of fluid in the equalizing piston chamber 61 and in equalizing reservoir 7 will then reduce to substantial equalization into the reduction chamber 71 of the reduction reservoir at the usual service rate followed by a slower rate of reduction through the restricted port 73 into the reduction chamber 72 to substantial equalization therein. This reduction in pressure in chamber 61 above the equalizing piston 55 permits brake pipe pressure in chamber 65 at the lower face of the piston to move said piston in an upwardly direction to thereby pull the discharge valve 66 from its seat. With the discharge valve 66 thus unseated, fluid under pressure is adapted to flow from brake pipe 14 through chamber 65 and past said valve to chamber 58 and thence through port 59 to the atmosphere to thereby effect a reduction in brake pipe pressure for applying the brakes on the cars of the train coupled to the locomotive.

Due to the equalizing piston 55 being controlled by the opposing pressures in the chambers 61 and 65, it will control the discharge valve 66, as is well known, to reduce brake pipe pressure at a rate and to a degree corresponding to the rate and degree of reduction in equalizing reservoir pressure effective in chamber 61.

The volume of reduction chamber 71 in the reduction reservoir 70 is so related to the volume of the equalizing reservoir 7 as to provide for an initial reduction in pressure in said reservoir, such as 6 pounds, which is sufficient to insure a reduction in brake pipe pressure which will cause the usual serial quick service operation of the brake equipment on the cars of the train to initiate an application of brakes. The volume of the reduction chamber 72 is such as to provide a still further reduction in brake pipe pressure of for instance 2 pounds making a total of 8 pounds reduction obtainable in the first service position of the brake valve device. The equalizing piston 55 maintains the discharge valve 66 unseated until the pressure in the brake pipe 14 is reduced to a degree just slightly exceeding the 8 pound reduction in equalizing reservoir pressure acting in the equalizing piston chamber 61 and then operates to close the discharge valve 66 so as to prevent further venting of fluid pressure from the brake pipe.

Thus in the first service position of the brake valve device, the pressure in the brake pipe 14 is initially vented at the usual service rate to provide for quick service operation of valve devices on the cars of the train and then at a slower rate to a limited degree to cause said valve devices to apply the brakes on the cars through the train with sufficient force, to cause a gentle gathering of the slack in the train toward the front end.

In first service position of the brake valve device 1 passage 78 connected to pipe 13 leading to the distributing valve device is supplied with fluid under pressure from the feed valve pipe 50 through the cavity 83 in the rotary valve device so that the equalizing portion 9 of the distributing valve device will be held in its release condition shown, to thereby maintain the application piston chamber 26 of the application portion 10 open to the distributing release pipe 23 which is vented to the atmosphere through the independent brake valve device 2.

The application cylinder pipe 21 connected directly to the application piston chamber 26 is also open to the atmosphere in first service position of the automatic brake valve device by way of cavity 87 and vent port 77 to further insure that the locomotive brakes will not be applied in this position of the brake valve device, as might possibly occur if the independent brake valve device 2 should inadvertently occupy a position other than shown or in case the equalizing portion of the distributing valve device should for any reason creep to its application position in which the application piston chamber 26 is disconnected from the release pipe 23.

Thus while causing a light application of brakes on the cars of the train with the brake valve device in first service position the brakes on the locomotive are held released so that the inertia of the locomotive may act in conjunction with the light application of brakes on the cars to insure that the slack in the train will be gathered without damaging shocks.

After the slack in the train has been gathered by use of first service position of the automatic brake valve device, the engineer may then move said brake valve device to service position to connect equalizing piston chamber 61 and equalizing reservoir 7 directly to the exhaust port 77 through the preliminary exhaust port 63 and the usual cavity 88 in the rotary valve 51. The pressure of fluid in the equalizing reservoir 7 and equalizing piston chamber 61 will then reduce at the usual service rate and the equalizing discharge valve mechanism including the piston 55 and discharge valve 66 will operate to reduce the pressure of fluid in the brake pipe 14 at a corresponding rate and to a like degree for causing the brakes on the cars of the train to apply for decelerating or stopping the train as required.

In service position of the brake valve device passage 78 communicating with pipe 13 leading to the distributing valve device is connected through the cavity 85 in the rotary valve to the brake pipe 14 so that the distributing valve device will then operate in the usual manner to apply the brakes on the locomotive in accordance with the reduction in pressure in brake pipe 14.

The degree with which the brakes on the cars and locomotive are applied may be limited if desired to any desired degree by the engineer moving the brake valve device from service position to lap position for closing the vent from the equalizing reservoir 7 and equalizing piston chamber 61 to the atmosphere. With this vent closed and the reduction in pressure in the equalizing piston chamber 61 thus limited the equalizing piston 55 will operate in the usual manner to close the discharge valve 66 when a like reduction in pressure is obtained in the brake pipe 14 to thereby limit the degree of brake application on the locomotive and cars of the train.

It should now be noted that the difference between this improved brake equipment and the No. 6-ET locomotive brake equipment which has been in use for years is that the holding position previously in the brake valve device has been converted into the first service position adapted to be used for providing a light and limited degree of brake application on the cars of a train and to delay operation of the distributing valve device to apply the brakes on the locomotive, so that the combined action of the inertia of the locomotive and the light application of brakes on the cars will insure a gentle gathering of the slack in the train. This control of the distributing valve device is obtained by controlling the communication between the equalizing piston chamber thereof and the brake pipe directly through the rotary valve in contrast to the conventional arrangement in which said chamber is in direct communication at all times with the brake pipe. It should also be noted that these improvements are obtained by adding only one passage to the brake valve device heretofore employed in the No. 6-ET locomotive brake equipment, by connecting a reduction limiting reservoir to a passage already in said brake valve device and by certain modifications of the rotary valve 51, or if desired, the substitution of a new rotary valve.

Description—Fig. 3

The locomotive brake equipment disclosed in Fig. 3 of the drawings is similar to that disclosed in Fig. 1 except for the addition of a protection valve device 90 and the omission of cavity 87 in the rotary valve 51.

In this embodiment the equalizing piston chamber 12 of the distributing valve device is connected by a pipe 91 to the seat of a slide valve 92 in the protection valve device 90 and the new passage 78 in the brake valve device is connected by a pipe 93 to the seat of said slide valve. A cavity 94 is provided in the slide valve 92 for normally connecting the pipes 91 and 93 together to thereby establish communication between the equalizing piston chamber 12 of the distributing valve device and passage 78 in the brake valve device so that the distributing valve device may be controlled by the brake valve device 1 in its various operating positions in the same manner as in the embodiment of the invention shown in Fig. 1 and hereinbefore described.

The slide valve 92 in the protection valve device is contained in a chamber 95 which is constantly charged with fluid under pressure from the feed valve device 5. A flexible diaphragm 96 is subject on one face to the pressure of fluid in the valve chamber 95 and on the opposite face to the pressure of fluid in a chamber 97 which is open through a passage and pipe 98 to the brake pipe 14. The slide valve 92 is mounted between two spaced shoulders on an operating stem 99 disposed in the chamber 95 and connected at one end to the diaphragm 96 for movement therewith. A spring 100 in chamber 97 acts on the diaphragm 96 for urging it and thereby the stem 99 and slide valve 92 to their normal positions shown.

When the brake equipment is charged with fluid under pressure, it will be apparent that the valve chamber 95 at one side of the diaphragm will be charged with fluid at the pressure supplied by the feed valve device 5 while chamber 97 at the opposite side of the diaphragm will be charged with fluid at brake pipe pressure and since these pressures are normally the same, i. e., when the brakes are released, the spring 100 will therefore be effective to maintain the diaphragm 96 and the slide valve 92 in their normal positions shown.

When the automatic brake valve device 1 is operated to first service position for effecting a limited reduction in pressure in the brake pipe 14 to apply the brakes on the cars of the train, it will be noted that the pressure of fluid in diaphragm chamber 97 of the protection valve device 90 reduces to a corresponding degree. The pressure of spring 100 on the diaphragm 96 is however at least great enough to offset this initial reduction in brake pipe pressure in diaphragm chamber 97 so as to maintain the slide valve 92 in the position shown and thereby retain communication between the pipes 91 and 93 open so that the distributing valve device will be held in its release position by fluid supplied from the feed valve device through the automatic brake valve device 1 in the first service position thereof.

After the slack in the train has been gathered due to movement of the automatic brake valve device to first service position, the operator then moves the brake valve to service position for effecting a further reduction in brake pipe pressure and for connecting the pipe 93 with the brake pipe 14. With the pipe 93 still in communication with pipe 91 through the protection slide valve 92 the distributing valve device will then operate to apply the brakes on the locomotive in accordance with the degree of reduction in brake pipe pressure in the same manner as occurred in the construction shown in Fig. 1.

The pressure of spring 100 on diaphragm 96 in the protection valve device 90 may be such as to maintain the protection slide valve 92 in the position shown for a full service reduction in brake pipe pressure in diaphragm chamber 97 under which condition the operation of the distributing valve device is dependent upon movement of the brake valve device to service position as above described. If desired however the pressure of said spring may be such that fluid under pressure in chamber 95 will overcome same upon completion of the initial light reduction in brake pipe pressure obtained in first service position of the automatic brake valve device and effective in chamber 97. When this occurs, feed valve pressure in chamber 95 will deflect the diaphragm 96 in a downwardly direction into engagement with a stop 101. This operation of the diaphragm will pull the slide valve 92 from the position shown to a position in which the pipe 91 is disconnected from pipe 93 and connected directly to the brake pipe 14 through a cavity 102 in the slide valve and passage 98. The distributing valve device will then respond to the reduction in brake pipe pressure and effect an application of the locomotive brakes the same as would be obtained in service position of the automatic brake valve device. It will therefore be apparent that the same result will be obtained by operation of the protection valve device at the termination of the initial reduction in brake pipe pressure as obtained by movement of the automatic brake valve device 1 to service position after the initial reduction.

The purpose of the protection valve device 90 however is to insure an application of brakes on the locomotive in case of failure of the brake pipe or the bursting of a hose between two coupled cars of a train when the automatic brake valve device is in the first service position initiating an application of brakes on the train while holding the brakes on the locomotive from applying. In such an emergency the fluid pressure in diaphragm chamber 97 will be suddenly vented along with that from the brake pipe 14 through the burst hose or the like and as a result the feed valve pressure in diaphragm chamber 95 will promptly move the diaphragm 96 downwardly into engagement with the stop 101 and thereby shift the slide valve 92 to its lower position for connecting pipe 91 from the distributing valve to the brake pipe 14 through the passage 98. Thus in case of a burst hose with the brake valve in first service position the equalizing portion of the distributing valve device will be caused to operate to supply fluid under pressure to the application passage 20 for supply to the application portion 10 of the distributing valve device to effect operation thereof to apply the brakes on the locomotive. The application passage 20 is always connected to the application cylinder pipe 21 but it will be noted that in this embodiment of the invention said pipe is lapped by rotary valve 51 in first service position so as to insure an application of locomotive brakes in case of emergency operation of the protection device 90, such as just described.

*Description—Fig. 5*

In this embodiment of the invention the automatic brake valve device 1 is similar to that shown in Fig. 1 except for the omission of passage 78 which is not required, since the control of the distributing valve device 3 is separate from the automatic brake valve device. The distributing valve device is however dependent upon operation of the automatic brake valve device to provide the same desired delay of locomotive brakes in first service position of the brake valve device as obtained in the embodiments previously described, and to obtain such delay a pilot valve device 105 is provided which is controlled from the automatic brake valve device through the medium of the fluid pressure supplied to the reduction limiting reservoir 70 in the first service position of the brake valve device.

The pilot valve device 105 comprises a flexible diaphragm 106 having at one side a chamber 107 which is connected to a passage 108 and having at the opposite side a chamber 109 which is in constant communication with the atmosphere through a breather port 110. In chamber 109 is a slide valve 111 which is mounted between spaced shoulders on a stem 112. The stem 112 has at one end a follower 113 which engages the diaphragm 106 while interposed between the opposite end of said stem and the casing is a spring 114 which is operative to urge the stem and thereby the slide valve 111 and diaphragm 106 to their normal positions shown. The slide valve 111 has a cavity 115 which in the normal position of the valve shown establishes communication between a pipe 116 connected to the equalizing piston chamber 12 of the distributing valve device 3 and a pipe 117 which is connected to the brake pipe 14.

Associated with the pilot valve device 105 is a protection valve device 120 which comprises a flexible diaphragm 121 having at one side a chamber 122 connected to the brake pipe 14 through pipe 117 and having at the opposite side a chamber 123 connected to the feed valve pipe 50 and thus constantly supplied with fluid at the pressure supplied by feed valve device 5. In chamber 122 is a spring 124 which acts on the diaphragm 121 for normally urging it to position shown, this spring corresponding in function to the spring 100 provided in the protection valve device 90 in the brake equipment shown in Fig. 3.

In valve chamber 123 is a slide valve 125 which is mounted between spaced shoulders on a stem 126 which is secured to the diaphragm 121 for movement therewith. In the slide valve is a cavity 127 which in the normal position of said slide valve shown is adapted to connect the passage 108 from the pilot valve diaphragm chamber 107 to the pipe 74 which communicates with the reduction reservoir 70.

The protection valve device 120 corresponds functionally to the protection valve device 90 shown in the embodiment of the invention in Fig. 3 and therefore is adapted to normally occupy the position shown and to remain in said position until after the pressure in the brake pipe has been reduced to a degree for causing the gathering of slack in a train. The parts of the pilot valve device 105 are also adapted to normally occupy the positions shown, i. e., when the brakes on the train are released, due to the action of spring 114. Normally therefore the equalizing piston chamber 12 in the distributing valve device 3 is in direct communication with the brake pipe 14 for the purpose of supplying fluid under pressure to the distributing valve device to effect charging thereof.

When it is desired to effect an application of brakes on the locomotive and cars of a train, the engineer's automatic brake valve device 1 is moved to the first service position for thereby connecting the equalizing reservoir 7 to the reduction limiting reservoir 70 to effect a predetermined limited reduction of pressure in the equalizing reservoir, for causing operation of the equalizing piston 55 and thereby the brake pipe discharge valve 66 to effect a corresponding limited reduction in pressure in the brake pipe 14. This reduction in brake pipe pressure is adapted to effect a limited application of the brakes on the train for the purpose of causing a gentle gathering of slack in the train as hereinbefore mentioned.

When fluid under pressure is supplied to the reduction limiting reservoir 70 as just mentioned, this pressure becomes effective through pipe 74 and passage 108 in chamber 107 on the diaphragm 106 of the pilot valve device 105 and is adapted to promptly effect deflection of said diaphragm in the direction of the right-hand against the opposing pressure of spring 114. This movement of the diaphragm 106 shifts the slide valve 111 to a position in which the cavity 115 is out of communication with the pipe 117 leading to the brake pipe 14 thereby disconnecting the distributing valve device 3 from the brake pipe 14 so as to prevent response thereof to the reduction in brake pipe pressure. The distributing valve device is thereby held against operating and as a consequence the brakes on the locomotive are held released in the first service position of the brake valve device 1.

In this embodiment of the invention the spring 124 acting on diaphragm 121 in the protection device 120 is of such value as to hold the diaphragm 121 and slide valve 125 in the position shown until completion of the initial reduction in brake pipe pressure provided for in first service position of the brake valve device and limited by the volume of the reduction reservoir 70. At substantially the time this initial reduction is completed, feed valve pressure in chamber 123 will overcome the pressure of spring 124 and the brake pipe pressure in chamber 122 and will deflect the diaphragm 121 in the direction of the right-hand into engagement with a stop 128. This deflection of diaphragm 121 shifts the slide valve 125 from the position shown to a position for disconnecting passage 108 from the pipe 74 and for connecting said passage to an atmosphere exhaust port 129. When the passage 108 is connected to the exhaust port 129 fluid previously supplied to diaphragm chamber 107 is vented to the atmosphere which permits spring 114 to return the stem 112, diaphragm 106, and the side valve 111 to their normal positions shown, to thereby again connect pipe 116 from the equalizing piston chamber 12 of the distributing valve device 3 to pipe 117 leading to the brake pipe 14. The distributing valve device then operates in accordance with the reduction in brake pipe pressure to apply the brakes on the locomotive.

The protection valve device 120 operates as just described to connect the distributing valve device 3 to the brake pipe 14 at substantially the time the engineer should move the automatic brake valve device from the first service position to the service position for continuing the reduction in brake pipe pressure. It will thus be apparent that in this embodiment of the invention the operation of the distributing valve device is delayed until after a certain light reduction in brake pipe pressure has been effected, and then automatically operates in response to operation of the protection valve device 120 to apply the brakes on the locomotive, this automatic operation occurring at substantially the same time that the engineer should move the automatic brake valve device from the first service to the service position. This embodiment of the invention is therefore adapted to provide substantially the same result as obtained by the brake equipments shown in Figs. 1 and 3 and hereinbefore described.

In this embodiment of the invention the application cylinder pipe 21 is lapped in the automatic brake valve device when in first service position and the protection valve device 120 is adapted to automatically respond to a reduction in brake pipe pressure resulting from a burst hose or the like, to cause operation of the distributing valve device 1 to apply the brakes on the locomotive, the same as in the embodiment shown in Fig. 3.

*Summary*

It will now be apparent that each of the embodiments of the invention is adapted to function upon movement of the automatic brake valve device to the first service position to delay the application of brakes on the locomotive and to effect a limited reduction in pressure in the brake pipe 14 for causing a limited application of the brakes on the cars of a train, to thereby insure a gentle gathering of slack in the train due to the combined action of the limited brake application on the cars and the inertia of the locomotive tending to maintain the slack in the train in a stretched out condition.

The holding off of the locomotive brakes in the first service position of the brake valve device is obtained by interrupting a brake control communication. In the illustrations this communication is the usual brake pipe connection between the distributing valve device and the brake pipe. This interrupting of the brake control communication may be effected directly by the automatic brake valve device, as in the embodiments of the invention shown in Figs. 1 and 3, or by additional means piloted from the brake valve device, as in Fig. 5, thus obtaining in either case substantially the same desired results. Where control of the distributing valve device is directly through the brake valve device, as in Figs. 1 and 3, a passage in the brake valve body and suitable control cavities or ports in the rotary valve are required. Such passage and ports or cavities are not required however when the brake valve device is merely employed as a pilot for controlling the distributing valve device, as in Fig. 5. In the latter case a relatively simple device is required for controlling the operation of the distributing valve device in response to operation of the brake valve device.

In the embodiments of the invention shown in Figs. 1 and 2 protection means are provided to insure operation of the distributing valve device to apply the brakes on the locomotive in case of an emergency such as due to a burst hose, when the brake valve device is in its first service position disconnecting, either directly or indirectly, the distributing valve device from the brake pipe.

As will now be apparent, the benefits of the invention may be secured in the well known No. 6–ET locomotive brake equipment by minor modifications thereof and/or by the addition thereto of relatively simple devices.

While several embodiments of the invention have been described in detail, it is not the intention to limit the scope to these embodiments or otherwise than by the terms of the appended claims.

Having now described my invention, what I claim as new and desire to secure by Letters Patent is:

1. In a locomotive fluid pressure brake equipment, in combination, a brake pipe, means operative upon a variation in pressure in a communication for effecting an application of locomotive brakes, an engineer's automatic brake valve device movable to a first service position for effecting a reduction in brake pipe pressure without disturbing the pressure in said communication and to another position for also effecting a reduction in brake pipe pressure and for at the same time effecting a variation in pressure in said communication, and means operative to limit the reduction in brake pipe pressure in said first service position of said brake valve device.

2. In a locomotive fluid pressure brake equipment, in combination, a brake pipe, means operative upon a variation in the pressure in a communication for effecting an application of locomotive brakes, an engineer's automatic brake valve device movable to either one of two service positions for effecting a reduction in brake pipe pressure and comprising means operative in one of said service positions but not in the other to effect a variation in pressure in said communication, and means operative in said other service position for limiting the degree of reduction in brake pipe pressure effected by operation of said brake valve device.

3. In a locomotive fluid pressure brake equipment, in combination, a brake pipe, a distributing valve device adapted to operate upon a reduction in the brake pipe pressure to effect an application of brakes on the locomotive, an engineer's automatic brake valve device movable to a first service position for effecting venting of fluid under pressure from said brake pipe and to another service position for also effecting venting of fluid under pressure from said brake pipe, means operative in said first service position to limit the degree of reduction in brake pipe pressure, and means conditioned by said brake valve device in said first service position for rendering said distributing valve device non-responsive to the reduction in brake pipe pressure and in the other service position responsive to the reduction in brake pipe pressure.

4. In a locomotive fluid pressure brake equipment, in combination, a brake pipe, valve means operative to effect an application of locomotive brakes, a communication adapted only when open to render said valve means operative to effect the application of locomotive brakes, an engineer's automatic brake valve device having a first service position and a service position and operative in both of said positions to effect venting of fluid under pressure from said brake pipe, and means operative to limit the reduction in brake pipe pressure effected by said brake valve device in said first service position, said brake valve device controlling said communication and effecting closure thereof in said first service position and opening thereof in the other service position.

5. In a locomotive fluid pressure brake equipment, in combination, a brake pipe, valve means operative to effect an application of locomotive brakes, a communication adapted only when open to render said valve means operative to effect the application of locomotive brakes, an engineer's automatic brake valve device having a first service position and a service position and operative in both of said positions to effect venting of fluid under pressure from said brake pipe, and means operative to limit the reduction in brake pipe pressure effected by said brake valve device in said first service position, said brake valve device controlling said communication and effecting closure thereof in said first service position, and means operative automatically upon completion of said first reduction in brake pipe pressure to open said communication.

6. In a locomotive fluid pressure brake equipment, in combination, a brake pipe, valve means operative to effect an application of locomotive brakes, a communication adapted only when open to render said valve means operative to effect the application of locomotive brakes, an engineer's automatic brake valve device having a first service position and a service position and operative in both of said positions to effect venting of fluid under pressure from said brake pipe, and means operative to limit the reduction in brake pipe pressure effected by said brake valve device in said first service position, said brake valve device controlling said communication and effecting closure thereof in said first service position, and means controlled by brake pipe pressure and operative automatically upon a reduction in said pressure exceeding said first reduction to open said communication for rendering said valve means operative to effect an application of locomotive brakes.

7. In a locomotive fluid pressure brake equipment, in combination, a brake pipe, a distributing valve device adapted to operate upon a reduction in brake pipe pressure to effect an application of locomotive brakes, and an engineer's automatic brake valve device controlling communication between said distributing valve device and brake pipe and having one operating position to effect closure of said communication.

8. In a locomotive fluid pressure brake equipment, in combination, a brake pipe, a communication which when open is adapted to provide for the application of locomotive brakes, an engineer's automatic brake valve device having one position for supplying fluid under pressure to said brake pipe and having two positions for venting fluid under pressure from said brake pipe, and means controlled by said brake valve device operative to close said communication in one of said two positions of said brake valve device.

9. In a locomotive fluid pressure brake equipment, in combination, a brake pipe, a communication which when open is adapted to provide for the application of locomotive brakes, an engineer's automatic brake valve device having one position for supplying fluid under pressure to said brake pipe and having two positions for venting fluid under pressure from said brake pipe, and means controlled by said brake valve device for controlling said communication and operative in one of said two positions of said brake valve device to close said communication and in the other of said two positions to open said communication.

10. In a locomotive fluid pressure brake equipment, in combination, a brake pipe, valve means adapted to operate upon a reduction in brake pipe pressure to effect an application of locomotive brakes, and an engineer's automatic brake valve device having two service positions for effecting a service reduction in brake pipe pressure, said brake valve device comprising means operable in one of said two positions to render said valve means unresponsive to the reduction in brake pipe pressure and in the other of said two positions responsive to the reduction in brake pipe pressure.

11. In a locomotive fluid pressure brake equipment, in combination, a brake pipe, valve means adapted to operate upon a reduction in brake pipe pressure to effect an application of locomotive brakes, and an engineer's automatic brake valve device having two service positions for effecting a reduction in brake pipe pressure, said brake valve device controlling communication between said valve means and brake pipe and being operative in one of said two positions to effect closure of said communication and in the other of said two positions to effect opening of said communication.

12. In a locomotive fluid pressure brake equipment, in combination, a brake pipe, valve means adapted to operate upon a reduction in brake pipe pressure to effect an application of locomotive brakes, a brake valve device having one position for supplying fluid under pressure to said brake pipe and two other positions for effecting a reduction in pressure in said brake pipe, and means including said brake valve device for controlling communication between said valve means and brake pipe and operative in said one position to connect said valve means with said brake pipe and in one of said two positions to effect closure of said communication.

13. In a locomotive fluid pressure brake equipment, in combination, a brake pipe, valve means adapted to operate upon a reduction in brake pipe pressure to effect an application of locomotive brakes, a brake valve device having one position for supplying fluid under pressure to said brake pipe and two service positions for venting fluid under pressure from said brake pipe, said brake valve device comprising a rotary valve controlling communication between said valve means and brake pipe and operative to open said communication in said one position and in one of said two service positions and to close said communication in the other service position.

14. In a locomotive fluid pressure brake equipment, in combination, a brake pipe, valve means adapted to operate upon a reduction in brake pipe pressure to effect an application of locomotive brakes, a brake valve device having one position for supplying fluid under pressure to said brake pipe and two service positions for venting fluid under pressure from said brake pipe, reduction limiting means operative in one of said two service positions to limit the reduction in brake pipe pressure effected by said brake valve device, and means controlled from said reduction limiting means for rendering said valve means non-responsive to the reduction in brake pipe pressure effected in said one service position.

15. In a locomotive fluid pressure brake equipment, in combination, a brake pipe, valve means adapted to operate upon a reduction in brake pipe pressure to effect an application of locomotive brakes, a brake valve device having one position for supplying fluid under pressure to said brake pipe and two service positions for venting fluid under pressure from said brake pipe, reduction limiting means operative in one of said two service positions to limit the reduction in brake pipe pressure effected by said brake valve device, and means controlled from said reduction limiting means for rendering said valve means non-responsive to the limited reduction in brake pipe pressure, said valve means being automatically responsive to a reduction in brake pipe pressure exceeding said limited reduction.

16. In a locomotive fluid pressure brake equipment, in combination, a brake pipe, valve means operative to effect an application of locomotive brakes, an engineer's automatic brake valve device having a position for effecting a reduction in brake pipe pressure, and means controlled by brake pipe pressure and cooperative with said brake valve device in said position to render said valve means inoperative to effect an application of locomotive brakes for a certain reduction in brake pipe pressure, said means being automatically operable upon a greater reduction in brake pipe pressure to render said valve means operative.

17. In a locomotive fluid pressure brake equipment, in combination, a brake pipe, valve means adapted to operate upon a reduction in brake pipe pressure to effect an application of locomotive brakes, an engineer's automatic brake valve device having a position for effecting a reduction in brake pipe pressure, and means controlled by brake pipe pressure and cooperative with said brake valve device in said position to close communication between said valve means and brake pipe, said means being automatically operative upon a reduction in brake pipe pressure exceeding a certain degree to open said communication.

18. In a locomotive fluid pressure brake equipment, in combination, a brake pipe, valve means adapted to operate upon a reduction in brake pipe pressure to effect an application of locomotive brakes, an engineer's automatic brake valve device having a position for effecting a reduction in brake pipe pressure and also operative in said position to close communication between said valve means and brake pipe, said brake valve device having another position for effecting a reduction in brake pipe pressure and for opening said communication, and means controlled by brake pipe pressure also controlling a communication between said valve means and brake pipe and operative automatically upon a reduction in brake pipe pressure exceeding a certain degree to open same.

19. In a locomotive fluid pressure brake equipment, in combination, a brake pipe, valve means adapted to operate upon a reduction in pressure in a chamber to effect an application of locomotive brakes, and a brake valve device having two service positions for effecting a reduction in brake pipe pressure and operative in one of said two positions to open communication between said chamber and brake pipe and in the other position to close said communication.

20. In a locomotive fluid pressure brake equipment, in combination, a brake pipe, valve means adapted to operate upon a reduction in pressure in a chamber to effect an application of locomotive brakes and upon an increase in pressure in said chamber to effect a release of locomotive brakes, a feed valve device, an engineer's brake valve device having one position for supplying fluid under pressure from said feed valve device to said brake pipe for charging same and to said chamber for effecting a release of locomotive brakes, said brake valve device having two service positions for effecting a reduction in pressure in said brake pipe and being operative in one of said two positions to maintain said chamber in communication with said feed valve device and in the other of said two positions to close said communication and to open said chamber to said brake pipe.

21. In a locomotive fluid pressure brake equipment, in combination, a brake pipe, valve means adapted to operate upon a reduction in pressure in a chamber to effect an application of locomotive brakes and upon an increase in pressure in said chamber to effect a release of locomotive brakes, a feed valve device, an engineer's brake valve device having one position for supplying fluid under pressure from said feed valve device to said brake pipe for charging same and to said chamber for effecting a release of locomotive brakes, said brake valve device having two service positions for effecting a reduction in pressure in said brake pipe and being operative in one of said two positions to maintain said chamber in communication with said feed valve device and in the other of said two positions to close said communication and to open said chamber to said brake pipe, and means controlled by the pressure of fluid in said brake pipe controlling communication between said chamber and brake valve device and operative automatically upon a chosen degree of reduction in brake pipe pressure to connect said chamber to said brake pipe.

22. In a locomotive fluid pressure brake equipment, in combination, a brake pipe, a feed valve device, valve means having a chamber adapted to be supplied with fluid under pressure from said feed valve device for effecting a release of locomotive brakes, said valve means being adapted to operate upon a reduction in pressure in said chamber to effect an application of locomotive brakes, an engineer's brake valve device having one position for supplying fluid under pressure from said feed valve device to said brake pipe and to said chamber for charging same and having two service positions for venting fluid under pressure from said brake pipe, said brake valve device in one of said two service positions opening communication between said feed valve device and chamber and in the other service position connecting said chamber with said brake pipe, and means controlled by the opposing pressures of fluid in said brake pipe and that supplied by said feed valve device and operative automatically when the brake pipe pressure is reduced a chosen degree below feed valve pressure to open said chamber to said brake pipe.

23. In a locomotive fluid pressure brake, in combination, a brake pipe, a communication which when open provides for effecting an application of locomotive brakes, an equalizing reservoir, a reduction limiting reservoir, an engineer's automatic brake valve device having two service positions and operative in one of said two positions to establish communication between said equalizing reservoir and reduction limiting reservoir for effecting a limited reduction in pressure in said equalizing reservoir and operative in the other of said two service positions to connect said equalizing reservoir to the atmosphere to effect a greater reduction in pressure in said equalizing reservoir, means operative in accordance with the reduction in pressure in said equalizing reservoir to effect a corresponding reduction in pressure in said brake pipe, valve means controlling said communication and operative by fluid pressure supplied to said reduction limiting reservoir to close said communication, and other valve means automatically operative to effect opening of said communication upon a reduction in brake pipe pressure exceeding that provided for in said one service position of said brake valve device.

24. In a locomotive fluid pressure brake, in combination, a brake pipe, a communication which when open provides for effecting an application of locomotive brakes, an equalizing reservoir, a reduction limiting reservoir, an engineer's automatic brake valve device having two service positions and operative in one of said two positions to establish communication between said equalizing reservoir and reduction limiting reservoir for effecting a limited reduction in pressure in said equalizing reservoir and operative in the other of said two service positions to connect said equalizing reservoir to the atmosphere to effect a greater reduction in pressure in said equalizing reservoir, means operative in accordance with the reduction in pressure in said equalizing reservoir to effect a corresponding reduction in pressure in said brake pipe, said communication being normally open, valve means controlling said communication and operative by fluid pressure initially supplied to said reduction limiting reservoir to close said communication, and other valve means controlled by brake pipe pressure and operative automatically to open said communication upon a reduction in brake pipe pressure exceeding that provided in said one service position of said brake valve device.

25. In a locomotive fluid pressure brake, in combination, a brake pipe, a communication which when open provides for effecting an application of locomotive brakes, an equalizing reservoir, a reduction limiting reservoir, an engineer's automatic brake valve device having two service positions and operative in one of said two positions to establish communication between said equalizing reservoir and reduction limiting reservoir for effecting a limited reduction in pressure in said equalizing reservoir and operative in the other of said two service positions to connect said equalizing reservoir to the atmosphere to effect a greater reduction in pressure in said equalizing reservoir, means operative in accordance with the reduction in pressure in said equalizing reservoir to effect a corresponding reduction in pressure in said brake pipe, delay valve means controlled by the pressure of fluid in said reduction limiting reservoir and operative automatically upon the initial supply of fluid under pressure thereto to close said communication, and valve means controlled by brake pipe pressure controlling said delay valve means and operative automatically upon a reduction in brake pipe pressure exceeding that provided in said one service position of said brake valve device to effect operation of said delay valve means to open said communication.

26. In a locomotive fluid pressure brake equipment, in combination, a brake pipe, a distributing valve device comprising an application portion communicating with an application cylinder pipe and operative by fluid under pressure supplied to said portion and acting in said pipe to effect an application of locomotive brakes, said distributing valve device further comprising an equalizing portion adapted to operate upon the reduction in pressure in a chamber for supplying fluid under pressure to said application portion, an engineer's automatic brake valve device having a normal position connecting said chamber with said brake pipe, and being movable therefrom to either one of two service positions for venting fluid under pressure from said brake pipe, said brake valve device in one of said service positions closing communication between said chamber and brake pipe and opening said application cylinder pipe to the atmosphere and in the other service position opening said chamber to said brake pipe and closing communication between said application cylinder pipe and the atmosphere.

27. In a locomotive fluid pressure brake equipment, in combination, a brake pipe, a distributing valve device comprising an application portion having an application cylinder and adapted to operate upon the supply of fluid under pressure to said cylinder for effecting an application of locomotive brakes, an application cylinder pipe in constant communication with said cylinder, said distributing valve device further comprising an equalizing portion having a piston chamber and adapted to operate upon a reduction in pressure in said chamber to supply fluid under pressure to said application cylinder, an engineer's automatic brake valve device having a running position for supplying fluid under pressure to said brake pipe and for connecting said chamber with said brake pipe, and being movable to either one of two service positions for effecting a reduction in pressure in said brake pipe, said brake valve device in one of said service positions closing communication between said chamber and brake pipe and in the other of said service positions opening said communication and in both of said service positions lapping said application cylinder pipe.

28. In a locomotive fluid pressure brake equipment, in combination, a brake pipe, a distributing valve device comprising an application portion having an application cylinder and adapted to operate upon the supply of fluid under pressure to said cylinder for effecting an application of locomotive brakes, an application cylinder pipe in constant communication with said cylinder, said distributing valve device further comprising an equalizing portion having a piston chamber and adapted to operate upon a reduction in pressure in said chamber to supply fluid under pressure to said application cylinder, an engineer's automatic brake valve device having a running position for supplying fluid under pressure to said brake pipe and for connecting said chamber with said brake pipe, and being movable to either one of two service positions for effecting a reduction in pressure in said brake pipe, said brake valve device in one of said service positions closing communication between said chamber and brake pipe and in the other of said service positions opening said communication and in both of said service positions lapping said application cylinder pipe, and valve means controlling communication between said chamber and brake valve device controlled by brake pipe pressure and operative automatically upon a reduction in brake pipe pressure exceeding a chosen degree to connect said chamber with said brake pipe independently of said brake valve device.

29. An engineer's automatic brake valve device of a No. 6-ET locomotive fluid pressure brake equipment having a brake pipe a reduction in pressure in which is adapted to effect an application of brakes on the cars of a train, said brake valve device comprising means operative to effect a reduction in brake pipe pressure, said brake valve device being modified to provide a new service position for effecting the operation of said means, said brake valve device also having a new passage, a variation in pressure in which is operative to effect an application of locomotive brakes, said brake valve device in said new position providing for the maintenance of the pressure of fluid in said new passage against variation.

30. An engineer's automatic brake valve device of a No. 6-ET locomotive brake equipment having a brake pipe, an equalizing reservoir, and a pressure reduction limiting means, said brake valve device comprising an equalizing discharge valve mechanism operative upon a reduction in pressure in said equalizing reservoir for effecting a corresponding reduction in pressure in said brake pipe, said brake valve device having the usual running position for charging said brake pipe and reservoir with fluid under pressure and the usual service position for effecting a reduction in pressure in said reservoir, and being provided with a new service position for connecting said reservoir to said reduction limiting means to effect a reduction in brake pipe pressure of such a degree as to cause gentle gathering of slack in a train, said brake valve device having a new passage a variation in pressure in which is operative to effect an application of locomotive brakes, said brake valve device in said new service position providing for the maintenance of the fluid pressure in said new passage against variation and in said usual service position being operative to effect a variation in pressure in said new passage.

31. An engineer's automatic brake valve device of a No. 6-ET locomotive brake equipment having a brake pipe, said brake valve device having the usual running, lap and service positions and having the usual locomotive brake release passage disconnected from the distributing valve release pipe of the equipment, said brake valve device having its holding position converted into a first service position for effecting venting of fluid under pressure through said passage in said first service position for effecting the venting of fluid under pressure from said brake pipe, said brake valve device having a new passage, a variation in pressure in which is adapted to effect an application of the locomotive brakes, said brake valve device in said first service position providing for the maintenance of the fluid pressure in said new passage against variation and in said service position being operative to effect a variation in pressure in said new passage.

32. An engineer's automatic brake valve device of a No. 6-ET locomotive brake equipment having a brake pipe, said brake valve device having the usual running, lap and service positions and having the usual locomotive brake release passage disconnected from the distributing valve release pipe of the equipment, said brake valve device having its holding position converted into a first service position for effecting venting of fluid under pressure through said passage in said first service position for effecting the venting of fluid under pressure from said brake pipe, said brake valve device having a new passage, a reduction in pressure in which is adapted to effect an application of the locomotive brakes and an increase in pressure in which is adapted to effect a release of locomotive brakes, said brake valve device in said running position providing for the supply of fluid under pressure to said brake pipe and to said new passage and in said service position providing for the venting of fluid under pressure from said brake pipe and connecting said new passage with said brake pipe, said brake valve device in said first service position maintaining the pressure of fluid in said new passage against reducing.

33. A locomotive brake equipment, comprising, a distributing valve device of a No. 6-ET locomotive brake equipment, having a brake pipe chamber and being adapted to operate upon a reduction in pressure in said chamber to effect an application of locomotive brakes and upon an increase in pressure in said chamber to effect a release of locomotive brakes, a distributing valve release pipe connected to said distributing valve device through which an application of locomotive brakes is adapted to be released, a brake pipe, an engineer's automatic brake valve device of a No. 6-ET locomotive brake equipment having a rotary valve movable to the usual running, lap and service positions for controlling the pressure of fluid in said brake pipe, the usual locomotive brake release passage in said brake valve device being disconnected from said distributing valve release pipe, a new passage in said brake valve device connected to said brake pipe chamber in said distributing valve device, the holding position of said rotary valve between running and lap position being converted into a first service position, said rotary valve in said running position being operative to supply fluid under pressure to said new passage and in said service position connecting said new passage to said brake pipe and in said first service position venting fluid under pressure through said release passage to effect venting of fluid under pressure from said brake pipe and also in said first service position maintaining the pressure of fluid in said new passage against reducing.

34. A locomotive brake equipment comprising a distributing valve device of a No. 6-ET locomotive brake equipment, having a brake pipe chamber and adapted to operate upon reduction in pressure in said chamber to effect an application of locomotive brakes and upon an increase in pressure in said chamber to effect a release of locomotive brakes, a distributing valve release pipe through which an application of locomotive brakes is adapted to be released, a brake pipe, a feed valve device, an engineer's automatic brake valve device of a No. 6-ET locomotive brake equipment having a rotary valve movable to the usual running, lap, and service positions for controlling the pressure of fluid in said brake pipe, the usual locomotive brake release passage in said brake valve device being disconnected from said distributing valve release pipe, a new passage in said brake valve device connected to said brake pipe chamber in said distributing valve device, said rotary valve in said running and first service positions being operative to supply fluid under pressure from said feed valve device to said new passage, said rotary valve in said service position being operative to connect said new passage to said brake pipe for rendering said distributing valve device responsive to a reduction in brake pipe pressure, and said rotary valve device in said first service position being operative to vent fluid under pressure through said release passage in said brake valve device to effect venting of fluid under pressure from said brake pipe.

35. A locomotive brake equipment comprising a distributing valve device of a No. 6-ET locomotive brake equipment, having a brake pipe chamber and adapted to operate upon a reduction in pressure in said chamber to effect an application of locomotive brakes and upon an increase in pressure in said chamber to effect a release of locomotive brakes, a distributing valve release pipe connected to said distributing valve device through which a release of locomotive brakes is effected by operation of said distributing valve device, an application cylinder pipe connected to said distributing valve device through which fluid under pressure is adapted to be vented for releasing the brakes on the locomotive independently of the pressure of fluid in said chamber, a brake pipe, a feed valve device, an engineer's automatic brake valve device of a No. 6-ET locomotive brake equipment having a rotary valve movable to the usual running, lap, and service positions for controlling the pressure of fluid in said brake pipe, the usual locomotive brake release passage in said brake valve device being disconnected from said distributing valve release pipe, and said application cylinder pipe being connected to said brake valve device in the usual manner, a new passage in said brake valve device connected to said brake pipe chamber in said distributing valve device, the holding position of said brake valve device between the running and lap positions thereof being converted into a first service position, said rotary valve in said running and first service positions being arranged to supply fluid under pressure from said feed valve device to said new passage and in said service position connecting said new passage to said brake pipe, said rotary valve in said first service position being arranged to vent fluid under pressure through said release passage to effect venting of fluid under pressure from said brake pipe and also to connect said application cylinder pipe with the atmosphere.

36. A locomotive brake equipment comprising a distributing valve device of a No. 6-ET locomotive brake equipment, having a brake pipe chamber, and adapted to operate upon a reduction in pressure in said chamber to effect an application of locomotive brakes and upon an increase in pressure in said chamber to effect a release of locomotive brakes, a distributing valve release pipe connected to said distributing valve device through which a release of locomotive brakes is effected by operation of said distributing valve device, an application cylinder pipe connected to said distributing valve device through which fluid under pressure is adapted to be vented for releasing the brakes on the locomotive independently of the pressure of fluid in said chamber, a brake pipe, a feed valve device, an engineer's automatic brake valve device of a No. 6-ET locomotive brake equipment having a rotary valve movable to the usual running, lap, and service positions for controlling the pressure of fluid in said brake pipe, the usual locomotive brake release passage in said brake valve device being disconnected from said distributing valve release pipe, and said application cylinder pipe being connected to said brake valve device in the usual manner, a new passage in said brake valve device connected to said brake pipe chamber in said distributing valve device, the holding position of said brake valve device between the running and lap positions thereof being converted into a first service position, said rotary valve in said running and first service positions being arranged to supply fluid under pressure from said feed valve device to said new passage and in said service position connecting said new passage to said brake pipe, said rotary valve in said first service position being arranged to vent fluid under pressure through said release passage to effect venting of fluid under pressure from said brake pipe and also to connect said application cylinder pipe with the atmosphere, and means connected to said release passage in said brake valve device operative to limit the venting of fluid under pressure therethrough in said first service position to a degree which provides for gentle gathering of slack in a train.

37. A locomotive brake equipment comprising a brake pipe, an engineer's automatic brake valve device of a No. 6-ET locomotive brake equipment, said brake valve device being modified to provide a first service position for effecting a reduction in pressure in said brake pipe and having a new passage communicating with a locomotive brake control pipe, a variation in pressure in said control pipe being adapted to effect an application of locomotive brakes, said brake valve device in said first service position providing for the maintenance of the fluid pressure in said new passage and thereby in said brake control pipe against variation, means cooperative with said brake valve device in said first service position to limit the reduction in brake pipe pressure to a degree which will cause gentle gathering of slack in a train, and means operative automatically upon a reduction in pressure in said brake pipe exceeding the said degree to effect a variation in said pressure in said brake control pipe independently of the operation of said brake valve device.

38. A locomotive brake equipment comprising a brake pipe, an engineer's automatic brake valve device of a No. 6-ET locomotive brake equipment having a service position for effecting a service reduction in pressure in said brake pipe and being modified to provide a first service position for also effecting a reduction in pressure in said brake pipe, means operative to limit the reduction in pressure in said brake pipe effected in said first service position to a degree for causing gentle gathering of slack in a train, a distributing valve device of a No. 6-ET locomotive brake equipment having a brake pipe chamber a reduction in pressure in which is adapted to effect operation of said distributing valve device to apply the locomotive brakes, said brake valve device having a new passage adapted to communicate with said brake pipe chamber, said brake valve device in said first service position providing for the maintenance of the pressure of fluid in said new passage and thereby in said brake pipe chamber and in said service position being arranged to connect said new passage to said brake pipe, and means controlled by brake pipe pressure and operative automatically upon a reduction in brake pipe pressure exceeding the limited degree of reduction obtained in said first service position to open said brake pipe chamber to said brake pipe independently of said brake valve device.

39. In a fluid pressure brake in combination, a brake pipe, an equalizing reservoir, a reduction limiting reservoir, an engineer's brake valve device including an equalizing discharge valve mechanism controlled by the opposing pressures of the equalizing reservoir and brake pipe and operative upon a reduction in pressure in said reservoir to effect a corresponding reduction in pressure in said brake pipe, said brake valve device further comprising a rotary valve movable to a position for establishing communication between said reservoirs to effect a limited reduction in pressure in said equalizing reservoir, a communication in which a variation in pressure is adapted to effect an application of the locomotive brakes, delay valve means controlling said communication and operative upon supply of fluid under pressure to said reduction limiting reservoir to maintain the pressure of fluid in said communication against variation, and valve means controlled by brake pipe pressure controlling said delay valve means and operative upon a reduction in brake pipe pressure exceeding said limited reduction to effect operation of said delay valve means to effect a variation in pressure in said communication independently of said brake valve device.

40. A locomotive brake equipment comprising a distributing valve device of a No. 6-ET locomotive brake equipment having a brake pipe chamber and adapted to operate upon a reduction in pressure in said chamber to effect an application of locomotive brakes, a brake pipe, delay valve means normally establishing communication between said chamber and said brake pipe, an equalizing reservoir, a reduction limiting reservoir, an engineer's automatic brake valve device of a No. 6-ET locomotive brake equipment comprising an equalizing discharge valve mechanism controlled by the opposing pressures of said brake pipe and equalizing reservoir and adapted to operate upon a reduction in equalizing reservoir pressure to effect a corresponding reduction in pressure in said brake pipe, said brake valve device further comprising a rotary valve having the usual running, lap, and service positions for controlling the pressure of fluid in said brake pipe and having its holding position converted into a first service position, said rotary valve in said first service position establishing communication between said equalizing reservoir and said reduction limiting reservoir, said delay valve means being controlled by the pressure of fluid in said reduction limiting reservoir and being operative upon the supply of fluid under pressure thereto to break communication between said brake pipe chamber in said distributing valve device and said brake pipe, and other valve means controlled by brake pipe pressure and operative upon a reduction in brake pipe pressure exceeding that determined by the volume of said reduction limiting reservoir to effect operation of said delay valve means to establish communication between said brake pipe chamber in said distributing valve device and said brake pipe.

GLENN T. McCLURE.